(No Model.)
W. READING.
SYSTEM OF DRAINING AND AERATING LAND AND APPARATUS THEREFOR.
No. 463,871. Patented Nov. 24, 1891.
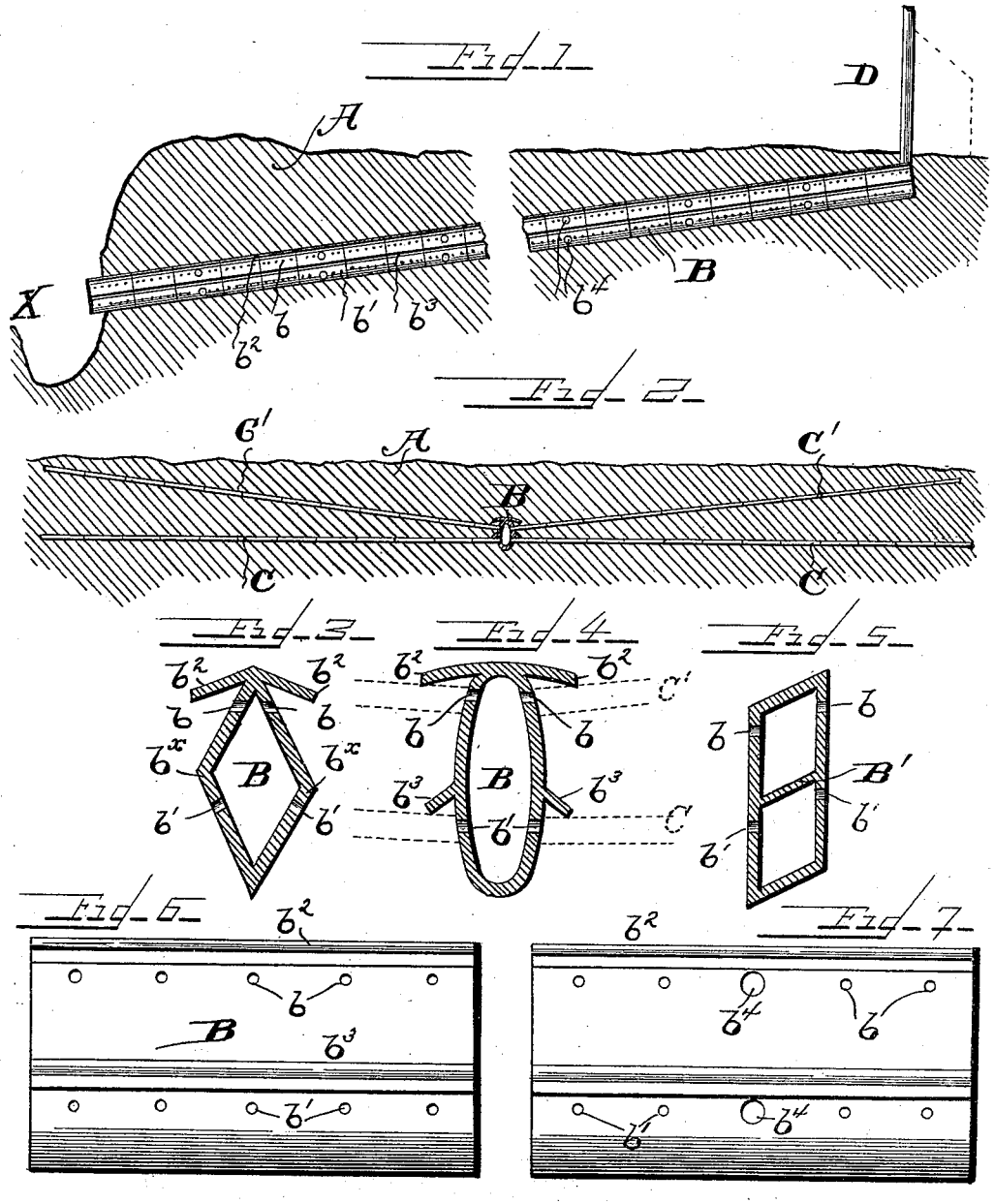

UNITED STATES PATENT OFFICE.

WILLIAM READING, OF ROCKVILLE, MARYLAND.

SYSTEM OF DRAINING AND AERATING LAND AND APPARATUS THEREFOR.

SPECIFICATION forming part of Letters Patent No. 463,871, dated November 24, 1891.

Application filed August 6, 1891. Serial No. 401,938. (No model.)

*To all whom it may concern:*

Be it known that I, WILLIAM READING, a citizen of the United States, residing at Rockville, in the county of Montgomery and State of Maryland, have invented certain new and useful Improvements in Systems of Drainage and Aerating Land and Apparatus Therefor; and I do hereby declare the following to be a full, clear, and exact description of the invention, such as will enable others skilled in the art to which it appertains to make and use the same.

My invention is an improved system of draining and aerating land and apparatus for carrying the same into effect; and it consists in the novel features hereinafter fully described.

In the accompanying drawings I have illustrated one form in which I have contemplated embodying my invention, and the said invention is fully disclosed in the following description and claims.

Referring to said drawings, Figure 1 is a partial section of a field, showing my invention applied for draining and aerating the land. Fig. 2 is a section taken at right angles to the line of section in Fig. 1 along the line of a set of laterals. Figs. 3, 4, and 5 are cross-sections of different forms of tile or pipe which may be employed in carrying my invention into effect. Figs. 6 and 7 are side elevations of two sections of tiling. Fig. 8 is a detail showing an air-forcing device and its application in my improved system.

The object of my invention is not only to remove water from low land, and thus render it fit for cultivation, but also to provide means for introducing air to the earth adjacent to the roots of the growing plants, and thus facilitate their growth.

I have found by observation that when the top portion of the earth has been packed down very tightly by heavy rains or otherwise and the air cannot penetrate to the roots of the plants they do not thrive so well, and then growth is very slow; but if the upper crust be broken and loosened up, so that the air can get to the roots of the plants, they will grow much more rapidly. By my invention I provide means for introducing air beneath the ground, so that it can have access at all times to the looser earth around the roots of the plants, and at the same time I also provide means for draining the land where it is necessary to render it fit for cultivation.

In the drawings, A represents a field of ground where water does not run off readily.

B is the main drain, which is laid through the middle of the land to be drained by it, several main drains being laid through a single field at the desired distance apart where the size of the field makes this necessary or desirable.

I prefer to employ a tile pipe formed of a series of tile-sections of the form shown in cross-section in Fig. 4. The main pipe B is provided with two rows of apertures $b\ b$ and $b'\ b'$, respectively located in different horizontal planes, and said pipe is also provided with longitudinally-extending ribs or flanges $b^2\ b^2$ and $b^3\ b^3$, which project laterally over said rows of apertures and prevent dirt, &c., from filling them up when the tile is laid in the ground.

Certain sections of the main pipe, which I shall term "coupling-sections," are provided with enlarged apertures $b^4$ to receive the ends of laterals C C', which are smaller pipes extending laterally from said main pipe B at both sides. One set of laterals C, which I term for convenience the "water-laterals," connects with said main pipe in line with the lower row of apertures $b'$. The other set of laterals C', which I term the "air-laterals," connect with said pipe B above the point of intersection of the water-laterals with said pipe and in line with the upper row of apertures $b$.

The lateral pipes may be formed of cylindrical or other shaped tiles, and are preferably provided with apertures. I prefer to employ the form of pipe shown in Fig. 9 for laterals, in which figure a pipe C is shown having a series of apertures $c$ and having longitudinally-extending webs or flanges $c'$ extending downwardly in such a manner as to protect the holes $c$ from dirt, &c.

The water-laterals extend from pipe B in a slightly-inclined direction upwardly, and conduct all water which enters said laterals to the pipe B. The air-laterals extend upwardly at a greater angle and have their outer ends at slightly more than plow depth below the surface of the ground. In the event of there being a great quantity of water in the ground, sufficient to fill the air-laterals also, they will serve as water-carrying pipes and will aid the water-laterals C in carrying off the superfluous moisture. The water in pipe B will be conducted to any desired point, as a running stream, which will carry off the water, as indicated at X in Fig. 1.

The water will ordinarily flow along the bottom of the drain-pipe B, leaving the upper portion of the pipe free to admit air, and by means of the air-laterals C' the air has access to the ground adjacent to the roots of the plants.

If it is desired to create a current of air, I may erect a vertically-extending pipe D and connect it with the upper end of the pipe B, and, if found necessary, connect said pipe D with a heater, as indicated in dotted lines in Fig. 1, to heat the air in said pipe, and thus create a draft through pipes B and D; or I may attach a blower or other air-forcing device to pipe B, as shown at E, Fig. 8.

In Fig. 3 I have shown a form of tile I may employ in constructing the main pipe B. In this form the main portion of the pipe is diagonal in cross-section and provided with two sets of apertures in different horizontal planes, as in the form before described with reference to Fig. 4. The upper series of holes is shielded by projecting webs or flanges $b^2 b^2$, while the angular corners $b^\times b^\times$ of the tile itself extend laterally beyond the portions which are perforated, and thus form overhanging parts to protect the apertures $b'$ from becoming filled with dirt.

In Fig. 5 I have shown still another form of tile, in which the air and water passages are separated by a partition B', and the angular construction of the tile will in a measure protect the apertures from becoming filled up with earth.

If I desire, I may provide pipe B with air-laterals only extending to near the surface of the ground, and they will then serve the double purpose of carrying off an excess of moisture and also of giving the air access to the earth around the roots of the plants.

I do not desire to be limited to the exact details of construction herein shown and described, as slight modifications might be made therein without departing from the spirit of my invention.

What I claim, and desire to secure by Letters Patent, is—

1. A system of pipes for improving and increasing the fertility of soils, consisting of a main pipe, a series of water-laterals, and a series of air-laterals connecting with the main pipe at points in different horizontal planes, substantially as described.

2. In a system for improving and increasing the fertility of soils, the combination, with the main pipe having its greatest diameter in a vertical plane and provided with a series of apertures at or below the center of the same, and a series of apertures at or near the top of the same, of a series of water-laterals connecting with said pipe in the plane of the lower series of apertures and a series of air-laterals connecting with the pipe in the plane of the upper series of apertures, substantially as described.

3. The herein-described pipe for the drainage and aeration of land, consisting of a main body provided with a series of apertures at or below the center of the same, a series of apertures at or near the top of the same, and flanges extending longitudinally of said pipe and projecting laterally above said series of apertures, in combination with a series of air-laterals and a series of water-laterals connecting with said pipe in different horizontal planes, substantially as described.

In testimony whereof I affix my signature in presence of two witnesses.

WILLIAM READING.

Witnesses:
DAVID H. BOUIC,
CHARLES D. MORGAN.